(12) United States Patent
Parthasarathy

(10) Patent No.: US 11,599,288 B2
(45) Date of Patent: Mar. 7, 2023

(54) LOGGING, STREAMING AND ANALYTICS PLATFORMS USING ANY S3 COMPATIBLE STORE AS PRIMARY STORE

(71) Applicant: Ranjan Parthasarathy, San Jose, CA (US)

(72) Inventor: Ranjan Parthasarathy, San Jose, CA (US)

( * ) Notice: Subject to any disclaimer, the term of this patent is extended or adjusted under 35 U.S.C. 154(b) by 0 days.

(21) Appl. No.: 15/931,248

(22) Filed: May 13, 2020

(65) Prior Publication Data

US 2021/0117116 A1  Apr. 22, 2021

Related U.S. Application Data

(60) Provisional application No. 62/916,230, filed on Oct. 17, 2019.

(51) Int. Cl.
    *G06F 3/06* (2006.01)
(52) U.S. Cl.
    CPC ............ *G06F 3/0644* (2013.01); *G06F 3/061* (2013.01); *G06F 3/064* (2013.01); *G06F 3/067* (2013.01); *G06F 3/0665* (2013.01)
(58) Field of Classification Search
    CPC ........ G06F 3/0644; G06F 3/061; G06F 3/064; G06F 3/0665; G06F 3/067
    See application file for complete search history.

(56) References Cited

U.S. PATENT DOCUMENTS

| 10,452,619 | B1* | 10/2019 | Panghal | G06F 16/178 |
| 2014/0149466 | A1* | 5/2014 | Sato | G06F 16/21 |
| | | | | 707/803 |
| 2015/0180891 | A1* | 6/2015 | Seward | H04L 63/1416 |
| | | | | 726/22 |
| 2020/0311096 | A1* | 10/2020 | Murthy | G06F 9/54 |

* cited by examiner

*Primary Examiner* — Nanci N Wong

(57) ABSTRACT

In one aspect, a computerized method includes the step of building an information technology operations analytics (ITOA) stack. The method includes the step of ingesting and storing data at rest. The method includes the step of storing a set of metadata of the ingested data in a virtual machine or a container. The method includes the step of maintaining a set of primary data of the ingested data with an object store. The method includes the step of packaging one or more data units of the set of primary data. The method includes the step of writing over objects at select intervals. The method includes the step of breaking objects into chunks to reduce overwrites. The method includes the step of laying the data out as partitioned by time. The method includes the step of creating one or more application boundaries at the time of ingesting.

6 Claims, 4 Drawing Sheets

LOGGING, STREAMING AND ANALYTICS PLATFORMS USING ANY S3 COMPATIBLE STORE AS PRIMARY STORE

CROSS-REFERENCE TO RELATED APPLICATIONS

This application is a continuation in part of U.S. Patent Provisional Application No. 62/916,230, titled AI POWERED LOGGING, STREAMING AND ANALYTICS PLATFORM BACKED BY ANY S3 COMPATIBLE STORE and filed on 17 Oct. 2019. This application is hereby incorporated by reference in its entirety.

FIELD OF THE INVENTION

The invention is in the field of web services and more specifically to a method, system and apparatus of logging, streaming and analytics platforms using any S3 compatible store as primary store.

DESCRIPTION OF THE RELATED ART

Currently, public cloud-computing platform users do not have a solution for streaming logging data from their virtual machines (VM's) and containers to an Amazon S3® data storage system in real time (e.g. assuming networking and processing latencies.). Contemporary solutions require data to be shipped to vendor cloud-computing platforms and can be five hundred times (500×) more expensive compared with Amazon S3® Complex ETL pipelines needed when data is used for further consumption.

BRIEF SUMMARY OF THE INVENTION

In one aspect, a computerized method includes the step of building an information technology operations analytics (ITOA) stack. The method includes the step of ingesting and storing data at rest. The method includes the step of storing a set of metadata of the ingested data in a virtual machine or a container. The method includes the step of maintaining a set of primary data of the ingested data with an object store. The method includes the step of packaging one or more data units of the set of primary data. The method includes the step of writing over objects at select intervals. The method includes the step of breaking objects into chunks to reduce overwrites. The method includes the step of laying the data out as partitioned by time. The method includes the step of creating one or more application boundaries at the time of ingesting.

Figure 1:
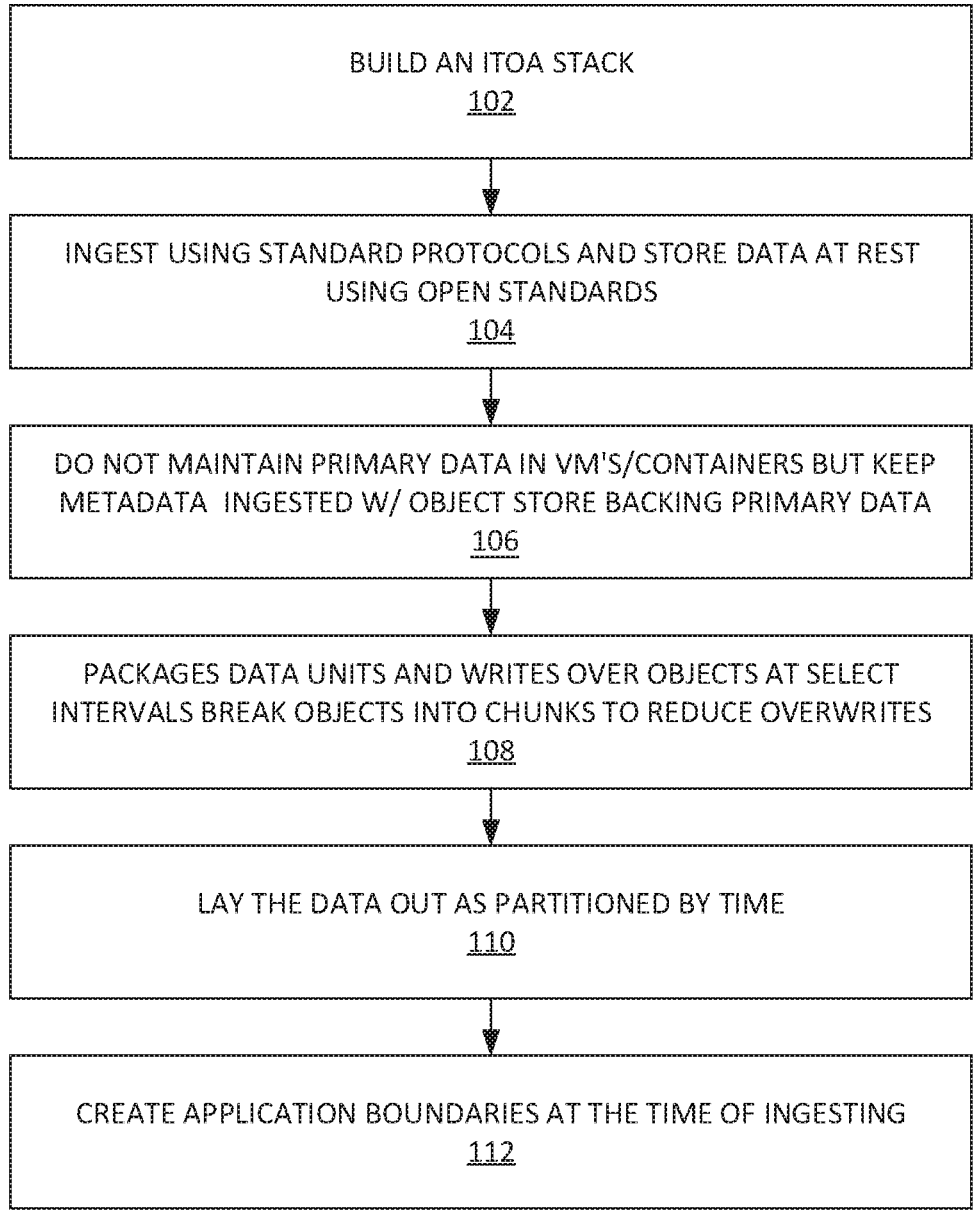
FIG. 1 illustrates an example process for implementing an AI powered logging, streaming and analytics platform, according to some embodiments.

The Figures described above are a representative set and are not an exhaustive with respect to embodying the invention.

DESCRIPTION

Disclosed are a system, method, and article of manufacture of a logging, streaming and analytics platforms using any S3 compatible store as primary store. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Amazon S3 (or Amazon Simple Storage Service) is a service offered by Amazon Web Services (AWS) that provides object storage through a web service interface. Amazon S3 uses the same scalable storage infrastructure that Amazon.com uses to run its global e-commerce network. It is noted that other cloud-based storage services can be utilized in other example embodiments.

Cloud computing can involve deploying groups of remote servers and/or software networks that allow centralized or decentralized data storage and elastic online access (meaning when demand is more, more resources will be deployed and vice versa) to computer services or resources. These groups of remote servers and/or software networks can be a collection of remote computing services.

Container can be a server virtualization method.

Extract, transform, load (ETL) is the general procedure of copying data from one or more sources into a destination system which represents the data differently from the source(s) or in a different context than the source(s).

gRPC is an open source remote procedure call (RPC) system. gRPC can use HTTP/2 for transport, Protocol Buffers as the interface description language, and provides features such as authentication, bidirectional streaming and flow control, blocking or nonblocking bindings, and cancellation and timeouts. gRPC can generate cross-platform client and server bindings for various languages.

Infrastructure as a service (IaaS) are online services that provide high-level APIs used to dereference various low-level details of underlying network infrastructure like physical computing resources, location, data partitioning, scaling, security, backup etc.

IT operations analytics (ITOA) is an approach or method to retrieve, analyze, and report data for IT operations. ITOA may apply big data analytics to large datasets to produce business insights.

Kubernetes is an open-source container-orchestration system for automating application deployment, scaling, and management. Example cloud services offer a Kubernetes-based platform or infrastructure as a service (PaaS or IaaS) on which Kubernetes can be deployed as a platform-providing service.

Hypervisor is a computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, LINUX, WINDOWS, and MACOS instances can all run on a single physical x86 machine.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set. Deep learning is a family of machine learning methods based on learning data representations. Learning can be supervised, semi-supervised or unsupervised.

MQTT (Message Queue Telemetry Transport) is an open OASIS and ISO standard (ISO/IEC PRF 20922) lightweight, publish-subscribe network protocol that transports messages between devices. The protocol usually runs over TCP/IP; however, any network protocol that provides ordered, lossless, bi-directional connections can support MQTT.

Object storage is a computer data storage architecture that manages data as objects, as opposed to other storage architectures like file systems which manages data as a file hierarchy, and block storage which manages data as blocks within sectors and tracks.

OpenStack is a free and open-source software platform for cloud computing, mostly deployed as infrastructure-as-a-service (IaaS), whereby virtual servers and other resources are made available to customers.

Reliable Event Logging Protocol (RELP) for data logging in computer networks.

Representational state transfer (REST) is a software architectural style that defines a set of constraints to be used for creating Web services. Web services that conform to the REST architectural style, called RESTful Web services, provide interoperability between computer systems on the Internet. RESTful Web services allow the requesting systems to access and manipulate textual representations of Web resources by using a uniform and predefined set of stateless operations. Other kinds of Web services, such as SOAP Web services, expose their own arbitrary sets of operations.

Virtual machine (VM) is an emulation of a computer system. VMs can be based on computer architectures and provide functionality of a physical computer. Their implementations can involve specialized hardware, software and/or a combination.

Write once read many (WORM), a type of data storage device.

Example Methods and Systems

FIG. 1 illustrates an example process 100 for implementing an AI powered logging, streaming and analytics platform, according to some embodiments. In step 102, process 100 can build an ITOA stack. This can include setting up systems to pull and/or obtain data via a push. This data can be data that is relevant to the IT infrastructure that is under consideration. For example, if operating a production cloud-based IT infrastructure, process 100 obtain telemetric information to build the ITOA stack. The ITOA stack can pull data from specified ports and/or specified IP addresses as well. Example infrastructure components can include, inter alia: hardware devices (e.g. switches, routers, servers, etc.), software infrastructure (e.g. operating system on a server, databases, webservers, user applications, email servers, etc.), virtual systems (e.g. virtual hypervisor, etc.). The infrastructure components can be used to obtain information about the health and/or statistics of the IT infrastructure and/or applications run thereon. This can include operating system statistics, application health reports, etc. The ITOA stack can obtain any data that is relevant for operations and analyze of the application within the IT infrastructure. In one example, a database can generate logs which include database transactions. These can be reviewed to identify user attacks, etc. The logs can be obtained and analyzed to determine how the software is performing in the database environment. Process 100 can capture specified operation aspects of the software and/or hardware systems under analysis. Servers can include, inter alia: filers, storage boxes, compute servers, etc. These can be analyzed to determine their operational health.

The ITOA stack can include a virtualization stack. For example, a hypervisor can generate telemetric data that is obtained. Additionally, data from virtual machines running inside the hypervisor can be obtained. Containers (e.g. running in the virtual machines, operating systems, etc.) can also be obtained. IaaS (e.g. Kubernetes, OpenStack, etc.) data can also be obtained. Data can also be obtained from applications run in containers in a distributed fashion. In one example, network traffic flow (e.g. from switches, virtual switches, etc.) can be obtained and analyzed as part of process 100 obtain data to understand health of a specified infrastructure.

The ITOA stack can use Amazon S3® compatible storage (or other similar system) as its primary storage. While Amazon S3® is used as the primary example of an object storage system, it is noted that other object storage systems (e.g. from various cloud services vendors like Microsoft (e.g. Microsoft Azure), Oracle (e.g. Oracle Cloud) and Google (e.g. Google Cloud Storage in 2010), and/or open-source development at Lustre, OpenStack (e.g. Swift, MogileFS, Ceph and OpenIO, etc.) can be utilized.

In step 104, process 100 can ingest using standard protocols (e.g. syslog, rsyslog, RELP, MQTT, REST APIs, etc.), and store data at rest using open standards. Syslog is a standard for message logging. It allows separation of the software that generates messages, the system that stores them, and the software that reports and analyzes them. Each message is labeled with a facility code, indicating the software type generating the message, and assigned a severity level. Rsyslog is an open-source software utility used on UNIX and Unix-like computer systems for forwarding log messages in an IP network. It implements the basic syslog protocol, extends it with content-based filtering, rich filtering capabilities, queued operations to handle offline outputs, support for different module outputs, flexible configuration options and adds features such as using TCP for transport. Reliable Event Logging Protocol (RELP), a networking protocol for computer data logging in computer networks, extends the functionality of the syslog protocol to provide reliable delivery of event messages. MQTT (MQ Telemetry Transport) is an open OASIS and ISO standard (ISO/IEC PRF 20922) lightweight, publish-subscribe network protocol that transports messages between devices. The protocol usually runs over TCP/IP; however, any network protocol that provides ordered, lossless, bi-directional connections can support MQTT. Data at rest can be data that is obtained by process 100 and is stored in an appropriate location (e.g. a database, etc.).

In step 106, process 100 does not maintain primary data in the VM's/Containers. Instead, step 106 only keeps metadata on what was ingested in VM's/Containers. The primary data is maintained with an object store backing primary data. The primary data can be data from the IT and/or other infrastructure components. This can used to respond to queries. It can also be copied and stored for later use. In one example, the primary data store can be in S3 (e.g. Amazon S3®, etc.). However, a small amount of data can be in memory/disk before being moved to S3. For example, process 100 can store some data in a temporary store before writing to S3. It is noted that the metadata about the primary data is stored in local memory/disks and may optionally be split between memory/disk/S3 compatible storage just like the primary data.

It is noted that object stores are not like files/block stores and/or a filesystem where a process can stream data and write a file incrementally. Objects in object stores can only be updated as a whole. For example, if ten (10) bytes are sent followed by one hundred (100) bytes, the object can be updated first with 10 bytes and then with 110 at a later time. This may pose a challenge in using Amazon S3® as a primary store. Accordingly, process 100 packages data units and writes over objects at select intervals. Process 100 can also break objects into chunks to reduce large overwrites in step 108.

Optionally, there can be an S3 caching gateway sitting between the logging, streaming and analytics platform 302 (e.g. LOGIQ software, etc.) and the S3 compatible object store that also exposes S3 compatible API's but caches small amounts of object to reduce API cost that is charged by many cloud vendors.

Continuing with the present example, the platform would first send the ten (10) bytes into a temporary store and then the one hundred and ten (110) bytes. This can eventually result in one write of 110 bytes. Once the data grows to a certain size, process 100 automatically breaks it into a chunk and creates a new chunk. For example, when the data grows into 1000 bytes, process 100 breaks it into a first chunk at 1000 bytes, the next check can hold data bytes from one thousand and one to two thousand (1001-2000).

In step 110, process 100 lays the data out as partitioned by time. Process 100 can effectively ingest arbitrary time series data and effectively query them. In one example, process 100 can implement time-based partitioning. Process 100 can ingest data from a specified infrastructure, partitions them by time and pushes them into a specified bucket. The data is stored in an open format and can connect a set of tools for further processing. Process 100 can implement data filtering. Process 100 can use a rule engine for more fine-grained data separation. Process 100 can implement isolation by separating logs by environment type, tenant, K8S namespace etc. to provide isolation at a bucket level. The rule engine can be used for more fine-grained data separation as well.

In step 112, process 100 can create application boundaries at the time of ingesting. In this way, process 100 can query data back using the metadata and fetching the correct Amazon S3® objects to obtain granular application data. Granular application data can be used to determine an origin of the data. In one example, sources provide matching rules for sender IP addresses. Sources can specify a single IP, a range of IP addresses or a list of IP addresses. A source definition can specify one or more of single IP, range of IP addresses or a list of IP addresses. In this case the source condition evaluates true if any of these source definitions are a match. In one example, incoming data streams can be filtered before they are written to the final store in the S3/S3-compatible bucket. Filter expressions allow fine grained matching on key attributes from the ingested data.

Figure 2:
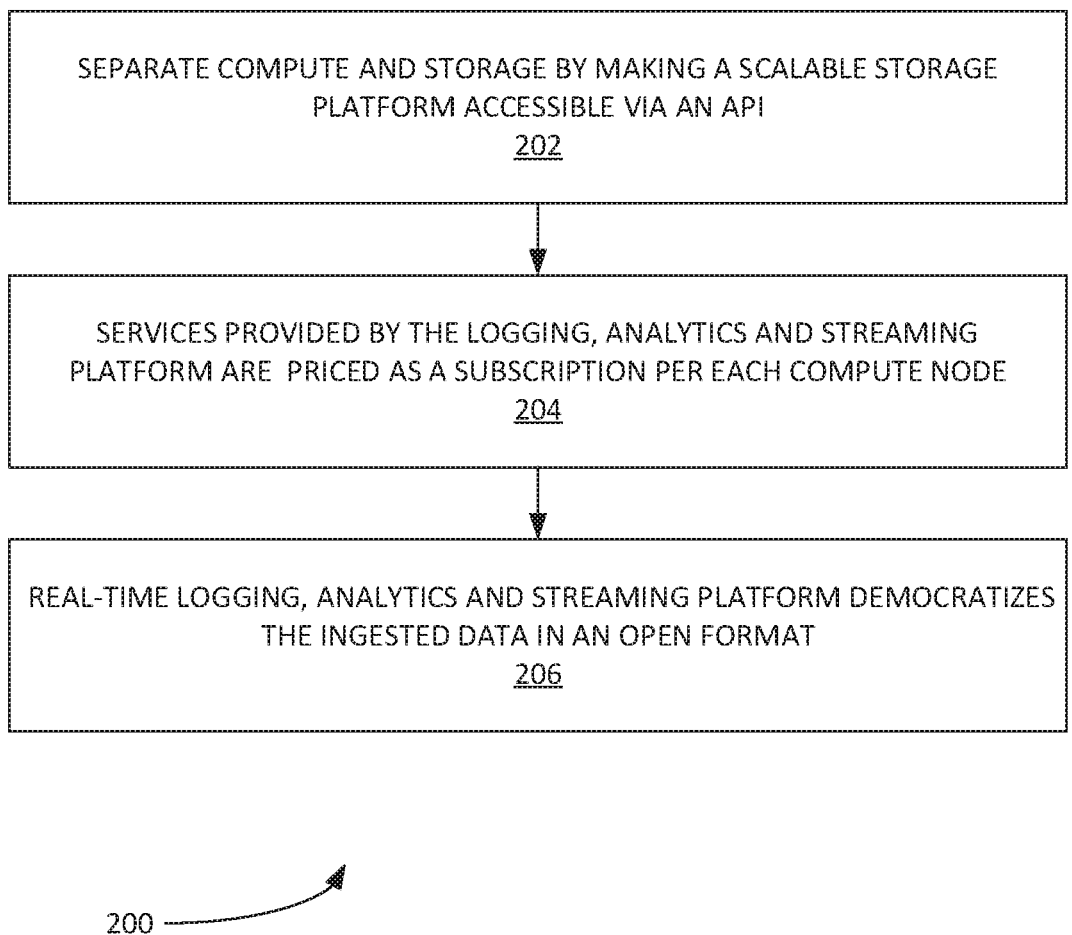
FIG. 2 illustrates another example process for implementing an AI powered logging, streaming and analytics platform, according to some embodiments.

FIG. 2 illustrates another example process 200 for implementing an AI powered logging, streaming and analytics platform, according to some embodiments. In step 202, process 200 separates compute and storage by making a scalable storage platform accessible via an API. The API can provide and managed by system 300 infra. This allows administrators to size analytics solutions by ingest rate allowing smaller-sized deployments.

In step 204, the services provided by the logging, analytics and streaming platform are priced as a subscription per each compute node vs. the variable pricing of cost per GB. This can provide significant cost savings over time.

In step 206, as a real-time logging, analytics and streaming platform democratizes the ingested data in an open format. This enables Amazon S3® compatible clients to consume the data without using additional tooling and transformation.

Example Systems

Figure 3:
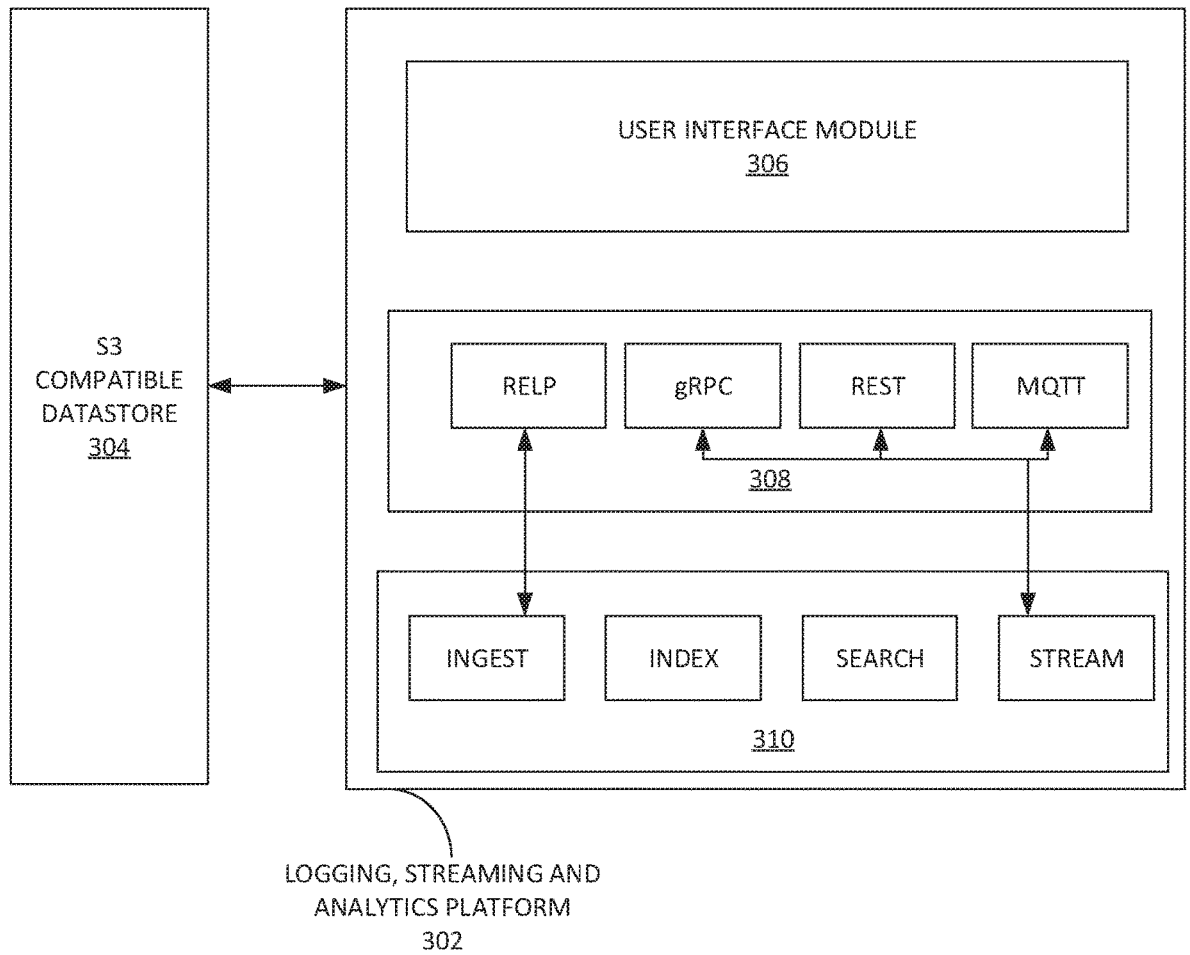
FIG. 3 illustrates an example system for an AI powered logging, streaming and analytics platform, according to some embodiments.

FIG. 3 illustrates an example system for an AI powered logging, streaming and analytics platform, according to some embodiments. System 300 can provide a converged architecture as a logging, streaming and analytics platform 302. Logging, streaming and analytics platform 302 can natively combine various components 304-308. For example, component 306 can implement data ingestion, partitioning, indexing, streaming, text search, etc. User interface module 304 can implement visualization into a single platform. System 300 can run on a specified cloud-computing platform. System 300 can scale elastically for predictable performance.

S3 compatible storage 302 can provide object storage through a web service interface (e.g. user interface module 302). S3 compatible storage 302 can be a preferred destination of choice for the following reasons: lowest cost (e.g. lower pricing compared to block (4×)/file storage (10×); limitless scalability; industry-standard compliance and/or governance capabilities such as WORM.

System 300 can Real-time logging, streaming and analytics platform backed by ANY S3 compatible store. System 300 can provide a converged analytics platform for logging, streaming and analytics using any S3 compatible store as its primary data-at-rest storage. System 300 can utilize an AI/ML based approach for log suppression vs log aggregation. In this way, system 300 can provide less noise and more relevant insights for the end user. System 300 can eliminate cost per GB pricing with a predictable per no de-subscription.

Figure 4:
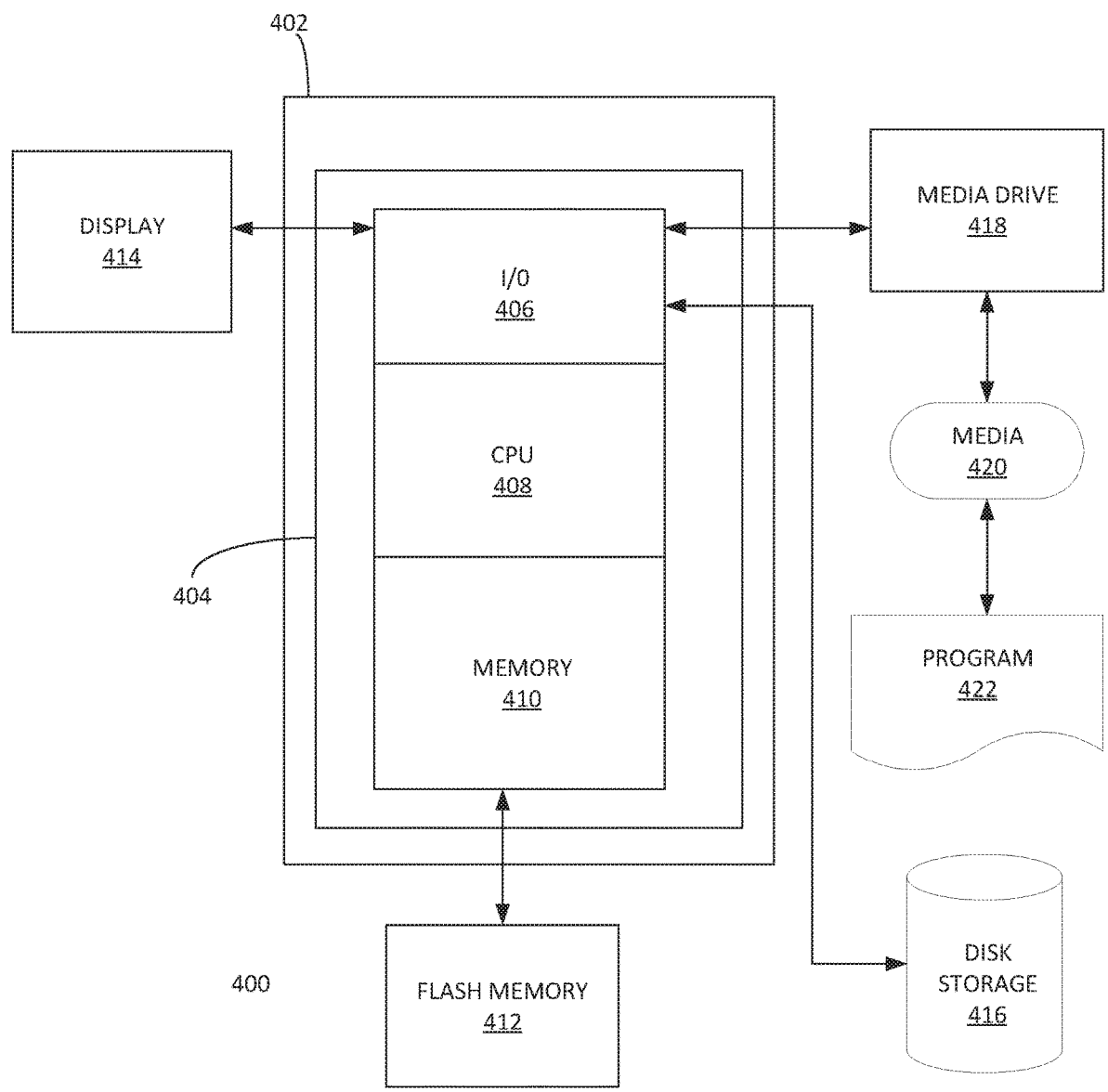
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional processes are now discussed. Attribute based isolation can be associated with a partitioning scheme. Ingested data can be isolated into separate buckets or separate folders within a bucket based on attributes in data for example. A partition scheme of namespace/year/month/day separates data into namespace folders providing strong data isolation in an S3 compatible object store within a bucket. Namespace can be an attribute of incoming data extracted by processes shown:

MyLoggingBucket:
Production/2020/12/20/ . . .
Development/2020/12/20/ . . .

In this case a customer can create a Glacier archival policy for their data using Namespace isolation by specifying namespace prefix within a bucket. It is noted that partition scheme in effect acts like an index into incoming data thus eliminating need for separate indexing.

Alternately, the namespace can be used to isolate into separate buckets:

MyProductionBucket is selected if namespace=Production, MyDevelopmentBucket is selected in namespace=Development MyProductionBucket:
2020/12/20/ . . .
2020/12/21/ . . .
MyDevelopmentBucket:
2020/12/20/ . . .

In this case a customer can create a Glacier archival policy for their data using Namespace isolation by specifying separate buckets.

It is noted that a partition specifies a partitioning scheme for the incoming data for a given destination. A user can specify a partition scheme using any of the attributes in the incoming data. Partitioning of data is important to ensure good query performance.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method comprising:
building an information technology operations analytics (ITOA) stack, wherein the ITOA stack uses a compatible object storage accessible through a web service interface as its primary storage;
through the web service interface, ingesting an ingested data at rest;

storing a set of metadata of the ingested data in a virtual machine or a container;
storing a set of primary data of the ingested data as a set of objects in an object store;
packaging one or more data units of the set of primary data by:
  writing over the set of objects at select intervals;
  breaking the set of objects into chunks to reduce overwrites;
partitioning the primary data by time, wherein the partitioning by time ingests an arbitrary time series data and queries the arbitrary time series data to implement a time-based partitioning version of the primary data;
filtering the time-based partitioning version of the primary data by implementing an isolation on the primary data by separating logs of the primary data by an environment type of the primary data, a tenant of the primary data, and a container orchestration system namespace to provide an isolation of the data at a bucket level;
creating one or more application boundaries at the time of ingesting to generate a granular application data;
querying the ingested data back using the set of metadata;
using the metadata to fetch a correct object; and
with the correct object, obtaining the granular application data, and wherein the granular application data is used to determine an Internet Protocol (IP) origin of the set of primary data.

2. The computerized method of claim 1, wherein a data partition specifies a partitioning scheme for an ingested data for a given destination.

3. The computerized method of claim 2, wherein the partition scheme acts as an index into incoming data.

4. The computerized method of claim 3, wherein the partitioning of data is used to enhance query performance.

5. The computerized method of claim 4, wherein the metadata about the primary data is stored in a local memory and is split between a memory compatible storage in a same manner as the primary data.

6. A computerized method comprising:
building an information technology operations analytics (ITOA) stack, wherein the ITOA stack uses a compatible object storage accessible through a web service interface as its primary storage;
through the web service interface, ingesting an ingested data at rest;
storing a set of metadata of the ingested data in a virtual machine or a container;
storing a set of primary data of the ingested data as a set of objects in an object store;
packaging one or more data units of the set of primary data by:
  writing over the set of objects at select intervals;
  breaking the set of objects into chunks to reduce overwrites;
partitioning the primary data by time, wherein the partitioning by time ingests an arbitrary time series data and queries the arbitrary time series data to implement a time-based partitioning version of the primary data;
filtering the time-based partitioning version of the primary data by implementing an isolation on the primary data by separating logs of the primary data by an environment type of the primary data, a tenant of the primary data, and a container orchestration system namespace to provide an isolation of the data at a bucket level;
creating one or more application boundaries at the time of ingesting to generate a granular application data;
querying the ingested data back using the set of metadata;
using the metadata to fetch a correct object; and
with the correct object, obtaining the granular application data, and wherein the granular application data is used to determine an Internet Protocol (IP) origin of the set of primary data; and
caching gateway that caches a specified amount of the object to reduce an API cost that is charged by a respective cloud vendor.

\* \* \* \* \*